United States Patent [19]
Leader

[11] Patent Number: 5,346,713
[45] Date of Patent: Sep. 13, 1994

[54] METHOD FOR FORMING A COMPRESSED BAR FROM AN OIL SEED CROP

[76] Inventor: Robert G. Leader, R.R. 1 Box 262, Brookston, Ind. 47923

[21] Appl. No.: 6,815

[22] Filed: Jan. 21, 1993

[51] Int. Cl.$^5$ ................................................. A23L 1/00
[52] U.S. Cl. .................................... 426/454; 426/634; 426/524
[58] Field of Search ............... 426/454, 448, 634, 518, 426/524

[56] References Cited

U.S. PATENT DOCUMENTS

| | | | |
|---|---|---|---|
| 4,260,640 | 4/1981 | Hartmann et al. | 426/524 |
| 4,273,789 | 6/1981 | Zimmerman | 426/513 |
| 4,744,995 | 5/1988 | Robinson | 426/454 |
| 4,748,037 | 5/1988 | Matsumoto et al. | 426/448 |
| 4,863,754 | 9/1989 | Ibuki et al. | 426/643 |
| 4,935,250 | 6/1990 | Cox | 426/94 |
| 4,943,441 | 7/1990 | McCabe | 426/448 |
| 4,945,807 | 8/1990 | Loomans et al. | 264/3.3 |
| 4,971,820 | 11/1990 | Likuski et al. | 426/646 |
| 5,009,908 | 4/1991 | Molaug et al. | 426/454 |
| 5,128,153 | 7/1992 | Axelrod | 426/643 |
| 5,129,304 | 7/1992 | Loomans et al. | 264/3.3 |
| 5,132,123 | 7/1992 | Laiho et al. | 426/74 |
| 5,133,266 | 7/1992 | Cullen | 110/233 |
| 5,137,012 | 8/1992 | Crossman, Jr. et al. | 110/286 |
| 5,137,969 | 8/1992 | Marten et al. | 264/185 |

*Primary Examiner*—George Yeung
*Attorney, Agent, or Firm*—Barnes & Thornburg

[57] ABSTRACT

An apparatus and method for forming a compressed bar from an oil seed crop including oil and meal. The apparatus includes an extruder for heating the oil seed crop to a predetermined temperature, a load barrel having an inlet for receiving the oil seed crop from the extruder and an outlet, and a ram located inside the load barrel. The apparatus also includes a cooling die assembly having a tube for receiving the oil seed crop therein. The tube has an inlet end coupled to the outlet of the load barrel and an outlet end. The cooling die assembly also includes a mechanism for cooling the oil seed crop as it passes through the tube. The apparatus further includes hydraulic piston and cylinder arrangement for moving the ram back and forth inside the load barrel to force the oil seed crop through the outlet of the load barrel and through the tube of the cooling die assembly to form the compressed bar which includes both the oil and meal from the oil seed crop as the oil seed crop is forced through the tube by the ram.

7 Claims, 2 Drawing Sheets

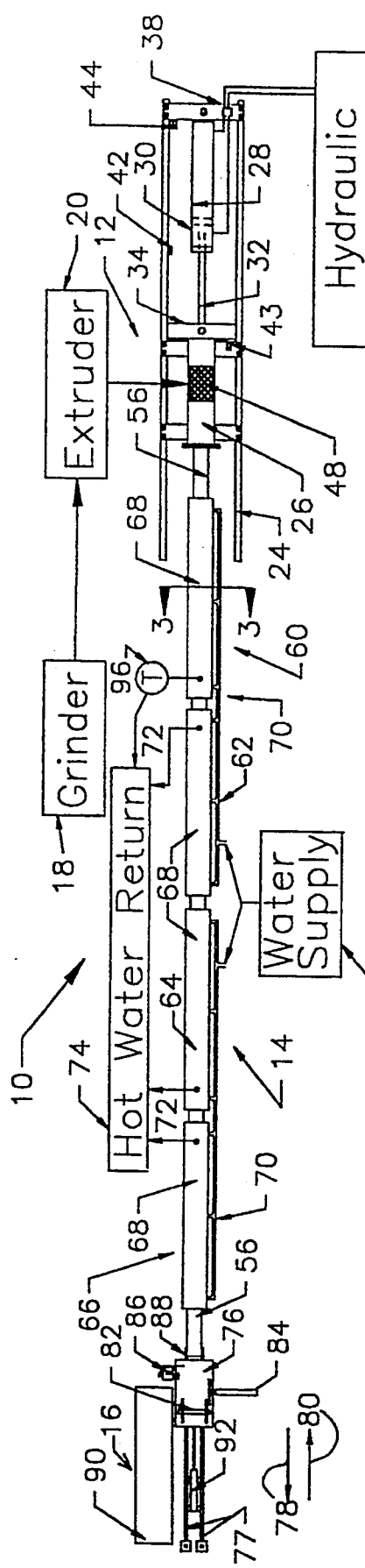
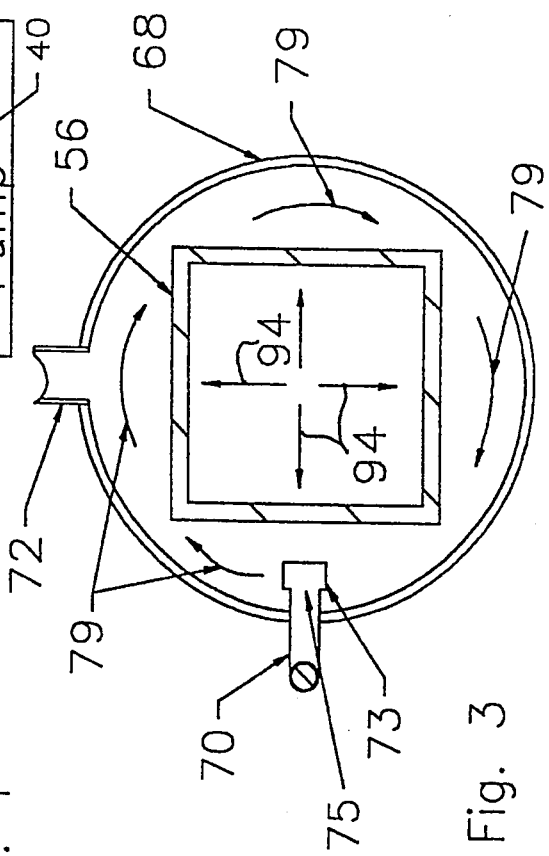
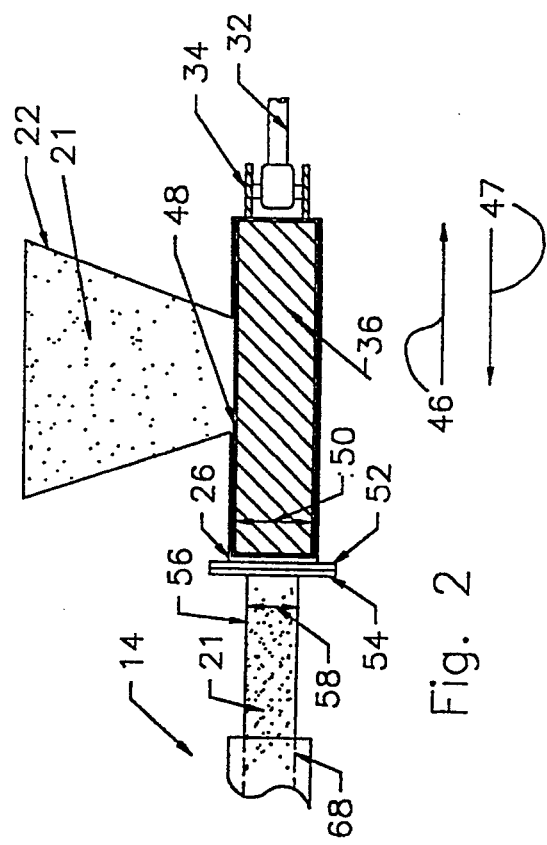

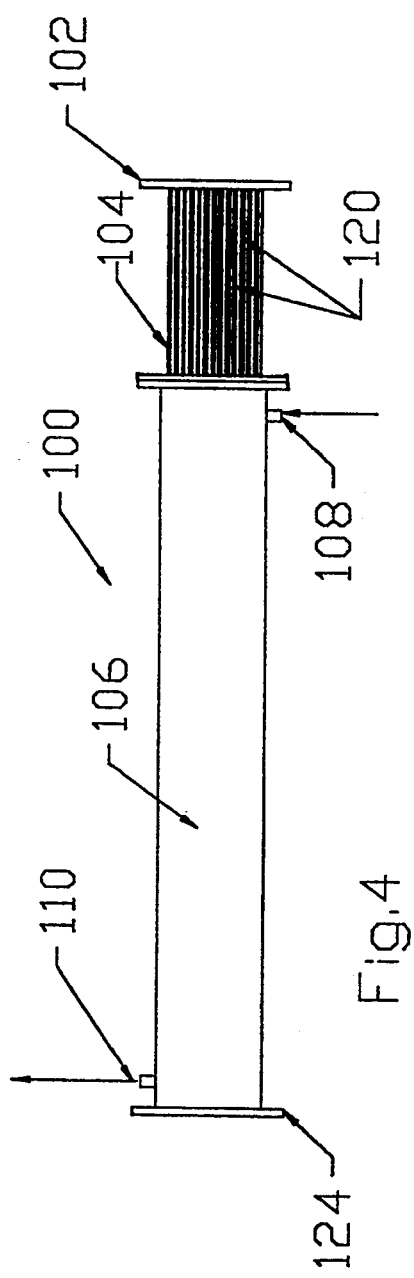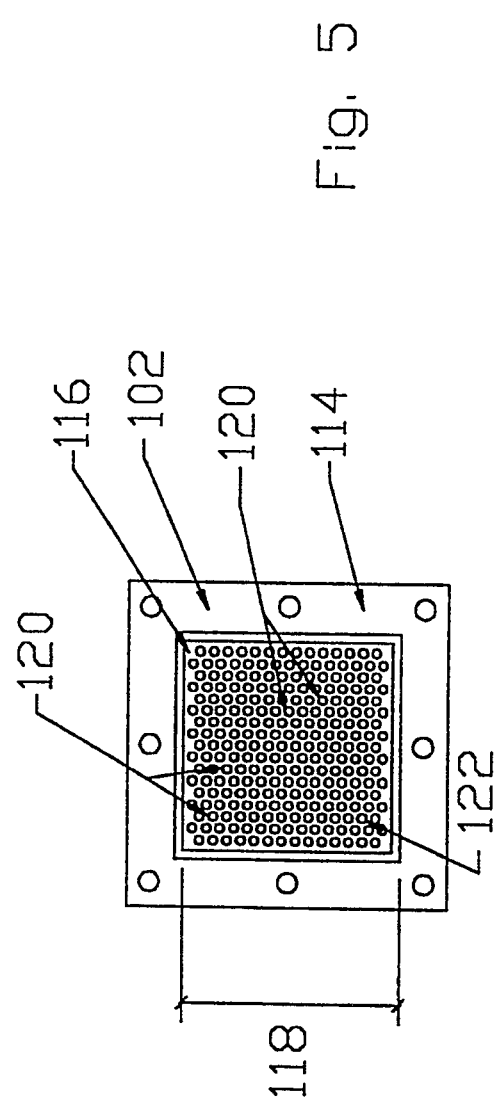

METHOD FOR FORMING A COMPRESSED BAR FROM AN OIL SEED CROP

BACKGROUND AND SUMMARY OF THE INVENTION

The present invention relates to a method and apparatus for forming a compressed bar from an oil seed crop. More particularly, the present invention relates to a press assembly and method for forming a compressed bar or block from an oil seed crop in which the bar contains substantially the full fat content of the oil seed crop. The compressed bar does not require the use of binders to hold the bar together.

Conventional oil seed crop processors separate oils from the meal of oil seed crops and sell the oil and the meal as separate products. Typically, hexene is used to extract all the oil from the oil seed crop. The hexene is then removed from the mixture. However, trace amounts of the hexene may remain in the oil removed using this method. Since the oils are removed from the meal, USDA approved binders must be added to the meal to slow water penetration into the meal. Compressed bars formed from meal which contains such binders typically repel water for only about 24 hours. After that time, the bars tend to disintegrate.

Conventional oil seed crop pellet-forming methods teach that the fat must be removed from meal in order to form a compressed pellet or block from the oil seed crop. The conventional pellet formation methods then use added chemical binders to hold the meal together in pellet form.

An object of the present invention is to provide a method and apparatus for forming a compressed bar from oil seed crops without the use of binders.

Another object of the present invention is to improve the resistance of compressed bars made from oil seed crops to moisture.

Pure vegetable oils are non-emulsifiable or non-soluble with water. In other words, pure vegetable oils will not mix with water. The present invention provides an apparatus and method for making compressed bars from an oil seed crop in which the bars retain substantially all the oil from the oil seed crop. Therefore, water cannot penetrate the compressed bars of the present invention.

Yet another object of the present invention is to provide a compressed full-fat oil bar made from oil seed crops to reduce the volume of material in a container, thereby reducing shipping costs for the product. This is especially important when shipping product overseas because product volume, not weight, is the limiting factor for shipping costs. The present invention reduces the volume of the oil seed crops to about one third the volume of the bulk material. This reduces overseas shipping costs substantially.

Still another object of the present invention to form compressed bars from an oil seed crop while maintaining the fatty acid contained in the oil seed crop in the compressed bars, thereby improving the nutritional value of the compressed bars. The compressed bars made from an oil seed crop are typically used for fish food for farm-raised fish, for fish or lobster bait, or for a food source for other animals or humans.

The apparatus and method of the present invention permits formation of compressed bars or pellets without removing oil and fat from the oil seed crop, thereby improving the levels of important fatty acids in the pellets. This improves the nutritional value of the compressed bars and pellets made from the oil seed crops.

The compressed bar of the present invention advantageously increases the quality of farm raised fish which may feed on the compressed bars of the present invention. Typically, fish raised in commercial fish farms have relatively low levels of omega-3 fatty acid. Omega-3 fatty acid is the type of fatty acid considered to be responsible for lowering cholesterol levels in the human body. A wild fish typically contains approximately 14% omega-3 fatty acid, while fish from farm raised ponds typically have less than 2% omega-3 fatty acid. This large difference is because current fish feeds do not contain adequate levels of omega-3 fatty acid. Compressed bars made from soybeans according to the present invention typically have about 8% omega-3 fatty acid content. In addition, flax can be added to the product to increase the omega-3 fatty acid content even more. Flax oil typically contains about 57% omega-3 fatty acid. By increasing the level of omega-3 fatty acid in the fish food, the level of omega-3 fatty acid in the fish also increases.

Forming compressed bars and pellets without removing the oil from the oil seed crops provides another important advantage as discussed above. Water cannot penetrate the compressed bars or pellets which include the oil from the oil seed crop. This improves the life of the bars or pellets when immersed in water for fish feed. The oil remaining in the bars or pellets also keeps the products from molding, even in high humidity conditions. This is important when the bars or pellets are stored in humid areas such as Florida or the Bahamas.

Soybeans or other oil seed crops are used to make the compressed bars or pellets. Typically the oil seed crop is ground with a typical feed grinder. The grinders are a common apparatus on most livestock farms. Although the product does not necessarily need to be ground, grinding generally improves the output of the processor by about 25%. The ground oil seed crop is passed through an extruder which augers the oil seeds through a series of steam locks until the product exits a hole in the end of a barrel that has a small area. The extruder heats the extruded product to about 270° F. in about 15 seconds. The apparatus and method of the present invention works best with the extruder running about 270°. If soybeans are being extruded, the temperature must remain at 270° or higher in order to kill inhibitors. The extruded product exits the extruder in a semi-liquid state.

The semi-liquid product drops directly into an insulated housing tub located on a load barrel assembly of the present invention. The semi-liquid oil seed product must remain hot until the load barrel assembly distributes the product into the cooling die assembly. A hydraulic ram retracts to allow a metered amount of the hot semi-liquid oil seed product to drop into an oversized load barrel. When the ram contacts a reversing switch, the hydraulic piston inside a cylinder assembly extends the ram to apply about 38,000 pounds of pressure against the oil seed product in the load barrel. This pressure forces oil to leave the meal in the product. However, because the load barrel is a closed system, the oil cannot escape and must remain with the meal. The oil seed product is forced into a tube of the cooling die assembly. The tube of the present invention is preferably at least 30% smaller than the output of the load barrel. If the tube is any larger, the hydraulic cylinder cannot develop the high pressure required for oil extraction.

In one embodiment of the present invention the cooling die is about 20 feet long and includes a 4-stage cooling assembly. Water is circulated through the cooling dies to cool the product. The first cooling stage maintains the product at a predetermined threshold temperature of about 180° F. or higher. If the first cooling stage cools the product below about 180° F., the compressed bars made by the press assembly tend to break. Inside the cooling die, the meal absorbs the hot runny oil. As it does, the product expands in the cooling die. This expansion creates extremely high side load pressures on the tube walls of the cooling die, thereby causing the product to plug within the cooling die. When the ram reloads and tries to press additional product into the cooling die, the cylinder has to develop enough pressure to unplug the die. If the product in the cooling die is cooled too rapidly, the product will absorb the oil and shrink as it is cooled. Therefore, the die would not be plugged and the cylinder could not develop the pressure required to extract the oil from the semi-liquid oil seed mixture.

The combination of an over-sized load barrel and high side load pressures from the expanding product causes the compressed bar to have all the oil and fatty acid that existed in the oil seed crop. As the product moves through the remaining three cooling stages, it becomes important to cool the product as rapidly as possible. Therefore, extra length for extra cooling capacity is added. One reason for quickly cooling the product is that over cooking the product can destroy the protein content of the product. In addition, the oil must be thickened so that it will not drip out of the finished product. When the oil recombines with the meal, it sets up as if it were a wax. This waxed oil will not mix with water and thereby repels water from entering the feed. The oil also keeps the product from molding, even in high humidity conditions.

Once the compressed bar exits the cooling die, the bar comes into contact with a stop block on a sliding cutting table. As the table moves, a normally open switch moves to its open position and causes a vertical saw to drop through the compressed bar, thereby cutting the bar into smaller bars having a predetermined length depending on the position of the stop block. Normally the bars are cut to be about 11.75 inches long. After the saw completes the cut, an air cylinder pushes the cut bar off the sliding cutting table and onto a conveyor belt located adjacent the sliding cutting table. Another air cylinder then relocates the sliding table for the next cut.

According to one aspect of the present invention, an apparatus is provided for forming a compressed bar from an oil seed crop including oil and meal. The apparatus includes means for heating the oil seed crop to a predetermined temperature, a load barrel having an inlet for receiving the oil seed crop from the heating means and an outlet, and a ram located inside the load barrel. The apparatus also includes a cooling die assembly having a tube for receiving the oil seed crop therein. The tube has an inlet end coupled to the outlet of the load barrel and an outlet end. The cooling die assembly also includes means for cooling the oil seed crop as it passes through the tube. The apparatus further includes means for moving the ram back and forth inside the load barrel to force the oil seed crop through the outlet of the load barrel and through the tube of the cooling die assembly to form the compressed bar which includes both the oil and meal from the oil seed crop as the oil seed crop is forced through the tube by the ram.

In the illustrated embodiment, the cooling means includes a first cooling stage coupled to the tube adjacent the outlet of the load barrel. The first cooling stage maintains the temperature of the oil seed crop at a temperature above a predetermined threshold temperature. The cooling die assembly also includes at least one additional cooling stage for cooling the oil seed crop further after it passes through the first cooling stage.

Each cooling stage includes a cooling jacket surrounding the tube and means for circulating water through the cooling jacket to cool the oil seed crop passing through the tube adjacent the cooling jacket. The first cooling stage includes a thermostat coupled to the circulating means to maintain the temperature of the oil seed crop in the first cooling stage at a temperature above the predetermined threshold temperature.

A substantial amount of pressure is required to form the compressed bar in the tube. Therefore, the inlet of the tube has an inlet area which is smaller than an outlet area of the outlet of the load barrel, thereby causing the oil seed product to plug inside the tube and increasing the pressure required to push the oil seed crop through the tube of the cooling die assembly. In the illustrated embodiment, the inlet area of the tube is at least 30% smaller than the outlet area of the outlet of the load barrel. The ram applies at least 38,000 pounds of pressure against the oil seed crop to form the compressed bar in the tube.

Also in the illustrated embodiment, the heating means includes an extruder for extruding the oil seed crop before the oil seed crop enters the load barrel. The extruder heats the oil seed crop to a predetermined temperature to form a semi-liquid product from the oil seed crop. The apparatus further includes an insulated tub coupled to the inlet of the load barrel. The insulated tub receives the semi-liquid product from the extruder and delivers the semi-liquid product to the load barrel as the ram moves back and forth inside the load barrel.

The moving means includes a hydraulic piston and cylinder coupled to the ram. The moving means also includes means for automatically controlling movement of the piston inside the cylinder coupled to provide reciprocating movement of the ram inside the load barrel. The apparatus also includes means for cutting the compressed bar into a plurality of smaller bars as the compressed bar exits the outlet end of the tube.

In another illustrated embodiment, the cooling die assembly includes a plurality of tubes coupled to the outlet of load barrel to form a plurality of compressed bars as the oil seed crop is forced through the plurality of tubes by the moving means. In this embodiment, the cooling means includes a cooling jacket surrounding a portion of the plurality of tubes and means for circulating water through the cooling jacket to cool the oil seed crop passing through the plurality of tubes. The cooling jacket surrounding a portion of the plurality of tubes is spaced apart from the inlet of the plurality of tubes to provide an uncooled entry section adjacent the outlet of the load barrel.

According to another aspect of the present invention, a method is provided for forming a compressed bar from an oil seed crop including oil and meal. The method includes the steps of heating the oil seed crop to a predetermined temperature and form a semi-liquid product and loading the semi-liquid product into an inlet of a load barrel. The load barrel has an outlet with a predetermined outlet area. The method also includes the step of applying pressure to the oil seed crop in the load barrel to force the oil seed crop into a tube having an inlet coupled to the outlet of the load barrel. The inlet of the tube has an inlet area which is smaller than the outlet area of the outlet of the load barrel, thereby increasing the pressure required to push the oil seed crop through the tube. The method further includes the steps of cooling the semi-liquid product in a first cooling stage located adjacent the outlet of the load barrel to a predetermined threshold temperature, and further cooling the semi-liquid product after the oil seed crop passes through the first cooling stage to form the compressed bar which contains both the oil and meal from the oil seed crop.

Additional objects, features, and advantages of the invention will become apparent to those skilled in the art upon consideration of the following detailed description of preferred embodiments exemplifying the best mode of carrying out the invention as presently perceived.

BRIEF DESCRIPTION OF THE DRAWINGS

The detailed description particularly refers to the accompanying figures in which:

FIG. 1 is a diagrammatical top view of an apparatus for forming a compressed bar from an oil seed crop according to the present invention;

FIG. 2 is a diagrammatical sectional view of a load barrel and a ram for forcing the oil seed crop through a cooling die assembly to form the compressed bar;

FIG. 3 is a sectional view taken along lines 3—3 of FIG. 1 illustrating details of the cooling die assembly;

FIG. 4 is a side elevational view of a pellet forming and cooling die for forming a plurality of compressed bars according to a second embodiment of the present invention; and FIG. 5 is an end view of an end plate of the pellet forming cooling die which is coupled to the load barrel output.

DETAILED DESCRIPTION OF THE DRAWINGS

Referring now to the drawings, FIG. 1 illustrates the compressed bar press assembly 10 of the present invention. Press assembly 10 is configured to form compressed bars from an oil seed crop. Press assembly 10 includes a load barrel and ram section 12, a cooling die assembly 14, and a cutting table assembly 16. A conventional feed grinder 18 is provided to grind the oil seed crop. The ground oil seed crop is then loaded into an inlet of an extruder 20. Extruder 20 includes an auger which forces the oil seed crop through steam lock holes. Extruder 20 raises the temperature of the oil seed crop to about 270° in about 15 seconds. At this temperature, the oil is separated from the meal of the oil seed crop to produce a semi-liquid substance. Preferably, the temperature range for extruder 20 is about 260° to about 280° F. Hotter temperatures tend to cause compressed bars made by press assembly 10 to crack and break. The semi-liquid product from extruder 20 falls into an insulated holding tub 22 illustrated in FIG. 2. Preferably, insulated holding tub 22 has a 9"×6" bottom opening, a 20" square top opening, and is 16" high.

Load barrel and ram assembly 12 includes frame 24, a load barrel 26 coupled to frame 24, and a hydraulic cylinder 28 which is also coupled to frame 24. A piston 30 is located within hydraulic cylinder 28. Piston 30 is coupled to a first end of actuator rod 32. A second end of actuator rod 32 is coupled to a ram guide plate 34. Ram guide plate 34 is coupled to a ram 36 located inside load barrel 26. Load barrel 26 is preferably a 7"×7" square tube which is 27" long and has a ¼" thickness. Ram 36 is preferably 6.5" square tubing having a length of 26.5". Movement of piston 30 within hydraulic cylinder 28 is controlled by a control valve 38 coupled to a hydraulic pump 40. Hydraulic cylinder 28 preferably has a 5.5" bore and a 22" stroke. Reverse cylinder limit switches 42 and 43 and a cylinder reversing relay 44 are provided to control movement of piston 30 within cylinder 28. As ram 36 is pulled in the direction of arrow 46 by piston 30, a metered amount of the semi-liquid oil seed product 21 flows from tub 22 into opening 48 of load barrel 26. As illustrated in FIG. 2, load barrel 26 has a predetermined outlet area illustrated by dimension 50. A flange plate 52 is coupled to the outlet end of load barrel 26. Flange 52 is coupled to flange 54 of cooling die assembly 14. Illustratively, flanges 52 and 54 are 10" square flanges having a ½" thickness. Flange 54 is coupled to an inlet end of a tube 56 which provides an inlet to cooling die assembly 14. Tube 56 has an inlet area illustrated by dimension 58 which is smaller than outlet area 50 of load barrel 26. Illustratively, tube 56 is a 4"×4" square tube.

Cooling die assembly 14 includes four cooling stages 60, 62, 64 and 66. Each cooling stage includes a 6½" diameter irrigation pipe which provides a cooling jacket 68 surrounding tube 56. Illustratively, cooling die assembly 14 is about 20' long. Each cooling jacket 68 has a length of about 51".

Water is circulated to each cooling jacket 68 through supply tubes 70 from a water supply 71. Water outlets from each cooling jacket 68 are coupled through tubes 72 to a hot water return 74. An end cap 73 is coupled to each of the supply tubes 70 inside jackets 68. End caps 73 are formed to include a ¼" hole 75 directed upwardly into cooling jackets 68. Water passing through hole 75 increases in velocity and causes circulation inside cooling jacket 68 around tube 56 in the direction of arrows 79. This circulation prevents hot water accumulation in the upper half of cooling jacket 68 which can cause uneven cooling of the product 21 in tube 56.

The oil seed product 21 passing through tube 56 is cooled to a threshold temperature of about 180° through first stage 60 of cooling die assembly 14. If the product 21 is too hot or if the product 21 cools to fast, the compressed bars will crack or break.

As ram 36 continues to move back and forth inside load barrel 26, the compressed bar is formed in tube 56. The compressed bar moves out outlet end 88 of cooling die assembly 14. Cutting table assembly 16 includes a slide table 76 which moves back and forth in the direction of arrows 78 and 80. Slide table 76 is mounted on spaced apart chrome rods 77. Cutting table assembly includes an adjustable block stop 82 coupled to slide table 76. An air cylinder 84 is provided to push cut blocks from slide table 76 after the blocks are cut by a vertical saw 86. As the compressed bar exits outlet end 88 of cooling die assembly 14, the bar engages stop block 82 on slide table 76. The block begins pushing slide table 76 in the direction of arrow 78. When slide table 76 begins to move, a switch (not shown) is actuated to cause the vertical saw to move downwardly and cut the bar. Air cylinder 84 is then actuated to push the cut bar off slide table 76 and onto output conveyor 90. An air cylinder 92 is provided to move slide table 76 in the direction of arrow 80 so that the next compressed bar can be cut from the product exiting outlet end 88 of cooling die assembly 14.

In operation, an oil seed crop is loaded into grinder 18 which grinds the oil seed crop. Grinder 18 is a conventional grinder commonly available on most livestock farms. Although the product does not necessarily have to be ground, grinder 18 generally improves the output of press assembly 10 by about 25%. The ground oil seeds are augered into an overhead bin located above extruder 20. Illustratively, extruder 20 is a model 600 Extruder available from Insta-Pro located in Des Moines, Iowa. Extruder 20 is powered by a PTO driven diesel tractor or other power supply. It is possible to use a larger extruder 20 such as a Model 2500 Extruder also available from Insta-Pro. This larger extruder requires about 200 horsepower to operate. Therefore, a separate diesel engine would need to be provided to run the larger extruder.

Extruder 20 augers the ground oil seeds to a series of steam locks until the product exits a small hole in the end of a barrel that has the diameter about the size of a pencil. Extruder 20 heats the oil seed product 21 to about 270° F. in about 15 seconds. If soybeans are being extruded, the temperature must remain at 270° F. or higher in order to kill inhibitors. The oil seed product 21 exiting extruder 20 is a semi-liquid product. Typically, about 94% of the product loaded into extruder 20 will pass through the outlet of extruder 20. About a 6% water content in the oil seed crop is lost during operation of extruder 20. The semi-liquid oil seed crop product 21 passes from extruder 20 into an insulated holding tub 22 coupled to load barrel 26. The product 21 must remain hot until the load barrel and ram assembly 12 can load the product into cooling die assembly 14.

Control valve 38 and hydraulic pump 40 operate to move piston 30 and ram 36 back and forth in the directions of arrows 46 and 47 in FIG. 3. Piston 30 first moves ram 36 in the direction of arrow 46 so that a metered amount of the semi-liquid product 21 drops into load barrel 26. When ram guide plate 34 contacts cylinder reversing switch 42, piston 30 moves inside cylinder 28 to extend ram 36 in the direction of arrow 47. Movement of ram 36 in the direction of arrow 47 applies about 38,000 pounds of pressure against product 21 inside load barrel 26. This pressure forces oil to leave the meal within product 21. However, load barrel 26 is a closed system so the oil must remain with the meal.

Tube 56 of cooling die assembly 14 has an area at least 30% smaller than the outlet of load barrel 26. The reduced inlet area generates the pressure necessary to form the compressed bar in tube 56. As ram 36 moves in direction of arrow 47, substantial side load forces are placed on tube 56 in the direction of arrows 94 in FIG. 3. These side load forces cause the product to plug in tube 56. Ram 36 continues to move back and forth to load additional product 21 into tube 56.

As discussed above, it is also important that product remains above 180° in first stage 60 of cooling die assembly 14. Therefore, a thermostat 96 is coupled to hot water return lines 72 in first stage 60. Thermostat 96 controls water flow to cooling jacket 68 of first cooling stage 60 to maintain the temperature within first stage 60 of cooling die assembly 14 at a threshold temperature of about 180°. In first stage 60 of cooling die assembly 14, the meal tries to absorb the hot oil of product 21. As it does, product 21 attempts to expand within tube 56 creating extremely high side load pressures in the directions of arrows 94 in FIG. 3. This causes cooling die assembly to plug. When ram 36 reloads and tries to press additional product into cooling die assembly 14, ram 36 must produce enough pressure to unplug the die. If the product 21 is cooled to rapidly, the product 21 will not absorb the oil and will shrink as it is cooled. Therefore, the cooling die assembly 14 will not plug and the load barrel assembly 12 will not be able to generate the required pressure to form the compressed bar of the present invention. Therefore, the combination of oversized load barrel 26 with the high side load pressures generated on inlet tube 56 of cooling die assembly 14 produce a compressed bar or a pellet having all the oil and fatty acid of the oil seed crop remaining in the compressed bar.

As product 21 continues to move through the remaining cooling stages 62, 64 and 66 of cooling die assembly 14, it is important to cool the product 21 as rapidly as possible. Overcooking the product 10 can destroy the protein content of the product. It is also desirable to thicken the oil in the compressed bar so that the oil will not drip out of the finished product. When the oil tries to recombine with the meal, the oil sets up as if it were a wax. The waxed oil will not mix with water and therefore keeps the compressed bars produced by the present invention from absorbing water upon water exposure. The oil also keeps the product from molding, even in high humidity conditions. This is important when storing the bars for use as fish food in areas such as Florida or the Bahamas.

Water from water supply 71 is circulated through inlet pipes 70 and outlet pipes 72 to hot water return 74 to provide cooling of the product as the product passes through the second, third, and fourth cooling stages 62, 64, and 66, respectively. The water used to cool the product 21 is preferably recycled. In the winter, it is possible to use a geothermal heat pump to gather the heat extracted from the product and distribute the heat in a house. During the summer, the hot water may be routed to reverse geothermal underground piping system. The energy from the hot water may also be used for processes such as alcohol production. As discussed above, compressed bars exiting cooling die assembly 14 are cut to a predetermined size by cutting cutter assembly 16.

Another embodiment of the present invention is illustrated in FIGS. 4–6. In this embodiment, smaller pellets of compressed oil seed product are made. The cooling die assembly 14 is replaced with another cooling die assembly illustrated in FIG. 4. Cooling die assembly 100 includes an inlet plate 102, an uncooled entry section 104, and a cooling section 106. Water is supplied to cooling section 106 through inlet 108 and water is removed from cooling section 106 through outlet 110. A jacket seal flange 112 is provided to keep the circulating water within cooling jacket 106. Preferably, cooling jacket 106 is about 60" long.

Inlet plate 102 is illustrated in more detail in FIG. 5. Typically, outer plate 114 has a dimension equal to flange 52 of load barrel 26. End plate 102 also has an inner section 116 having a dimension illustrated by double-headed arrow 118. Illustratively, dimension 118 is 7", the size of the load barrel output. The plurality of tubes 120 are provided for receiving product 21 from load barrel 26. Tubes 120 extend all the way through cooling section 106. A solid front face 122 is provided so that the product passes through tubes 120. The combined area of tubes 120 is less than the area of outlet end of load barrel 26. Therefore, the side load pressures required to form compressed bars or pellets in tubes 120 are obtained. As ram 36 moves back and forth in the directions of arrows 46 and 47, product is forced through tubes 120. Therefore, product passes through uncooled entry section 104 and then into the cooling jacket 106 which surrounds tubes 120. Water circulates through cooling jacket 106 and around tubes 120 by passing through inlet 108 and outlet 110 to cool the product within tubes 120. The plurality of compressed bars from tubes 120 exit outlet end 124 of cooling die assembly 100. The plurality of compressed bars are then cut to a predetermined size to form compressed pellets made from the oil seed crop. The pellets are smaller than the compressed bars formed in the embodiment disclosed in FIGS. 1-3. The smaller pellets may be desirable for certain applications.

The compressed bars or pellets formed by the present invention advantageously include all the oil existing in an oil seed crop. As discussed above, the compressed bars or pellets therefore have an increased nutritional value over conventional bars in which the oil is separated from the meal and then binders are added to hold the meal together and repel water. In addition, other nutritional supplements, vitamins, or drugs may be added to the oil seed crop product 21 in tub 22 or elsewhere. These nutritional supplements would then be held inside the compressed bars or pellets to supplement the diet for the consumer of the compressed bars or pellets.

Although the invention has been described in detail with reference to certain preferred embodiments, variations and modifications exist within the scope and spirit of the invention as described and defined in the following claims.

What is claimed is:

1. A method of forming a compressed bar from an oil seed crop including oil and meal, the method comprising the steps of:
    heating the oil seed crop to a predetermined temperature to form a semi-liquid product;
    loading the semi-liquid product into an inlet of a load barrel, the load barrel having an outlet with a predetermined outlet area;
    applying pressure to the oil seed crop in the load barrel to force the oil seed crop into a tube having an inlet coupled to the outlet of the load barrel, the inlet of the tube having an inlet area which is smaller than the outlet area of the outlet of the load barrel, thereby increasing the pressure required to push the oil seed crop through the tube;
    cooling the semi-liquid product in a cooling stage located adjacent the outlet of the load barrel to a predetermined threshold temperature; and
    further cooling the semi-liquid product after the oil seed crop passes through the cooling stage to form the compressed bar which contains both the oil and meal from the oil seed crop.

2. The method of claim 1, further comprising the step of grinding the oil seed crop prior to the heating step.

3. The method of claim 1, wherein the heating step heats the oil seed crop to a temperature of about 270° F.

4. The method of claim 3, wherein the predetermined threshold temperature is about 180° F.

5. The method of claim 1, wherein the pressure applying step applies about 38,000 pounds of pressure against the oil seed crop in the load barrel.

6. The method of claim 1, wherein the step of applying pressure to the oil seed crop in the load barrel includes the step of moving a ram back and forth inside the load barrel.

7. The method of claim 1, wherein the inlet area of the tube is about 30% smaller than the outlet area of the load barrel.

* * * * *